March 12, 1963

G. A. GRUBB 3,080,729

ABSORPTION REFRIGERATION

Filed Jan. 27, 1961

INVENTOR.
Gunnar Axel Grubb
BY
Edmund A. Venander
his ATTORNEY

March 12, 1963 G. A. GRUBB 3,080,729
ABSORPTION REFRIGERATION
Filed Jan. 27, 1961 3 Sheets-Sheet 2

INVENTOR.
Gunnar Axel Grubb
BY
Edmund A. Flamander
his ATTORNEY

March 12, 1963

G. A. GRUBB 3,080,729

ABSORPTION REFRIGERATION

Filed Jan. 27, 1961

INVENTOR.
Gunnar Axel Grubb
BY
Edmund O. Flanders
his ATTORNEY

United States Patent Office 3,080,729
Patented Mar. 12, 1963

3,080,729
ABSORPTION REFRIGERATION
Gunnar Axel Grubb, Bromma, Sweden, assignor to Aktiebolaget Electrolux, Stockholm, Sweden, a corporation of Sweden
Filed Jan. 27, 1961, Ser. No. 85,304
Claims priority, application Sweden Jan. 30, 1960
16 Claims. (Cl. 62—497)

This invention relates to absorption refrigeration apparatus of the kind in which vapor is expelled out of solution by heating.

It is an object of the invention to provide for absorption refrigeration apparatus an improved heating structure having a pair of heating member for heating the apparatus by different sources of heat, each of which alone is capable of supplying heat at an adequate rate and at a sufficiently elevated temperature to effect normal operation of the refrigeration apparatus under all conditions under which the apparatus is intended to be operated, and throttling the flow of heat from the heat receiving structure to one of the heating members when the refrigeration apparatus is being operated by the other of the heating members.

Another object of the invention is to provide for a vapor-expulsion unit of absorption refrigeration apparatus an improved heat receiving structure having a heating member and a heating flue to heat the apparatus either by an electrical heating element or a fluid fuel burner, respectively, and throttling the flow of heat from the heat receiving structure to the heating flue when the refrigeration apparatus is being operated by the electrical heating element.

The invention, together with the above and other objects and advantages thereof, will be more fully understood upon reference to the following description and the accompanying drawing forming a part of this specification, and in which.

Figure 1:
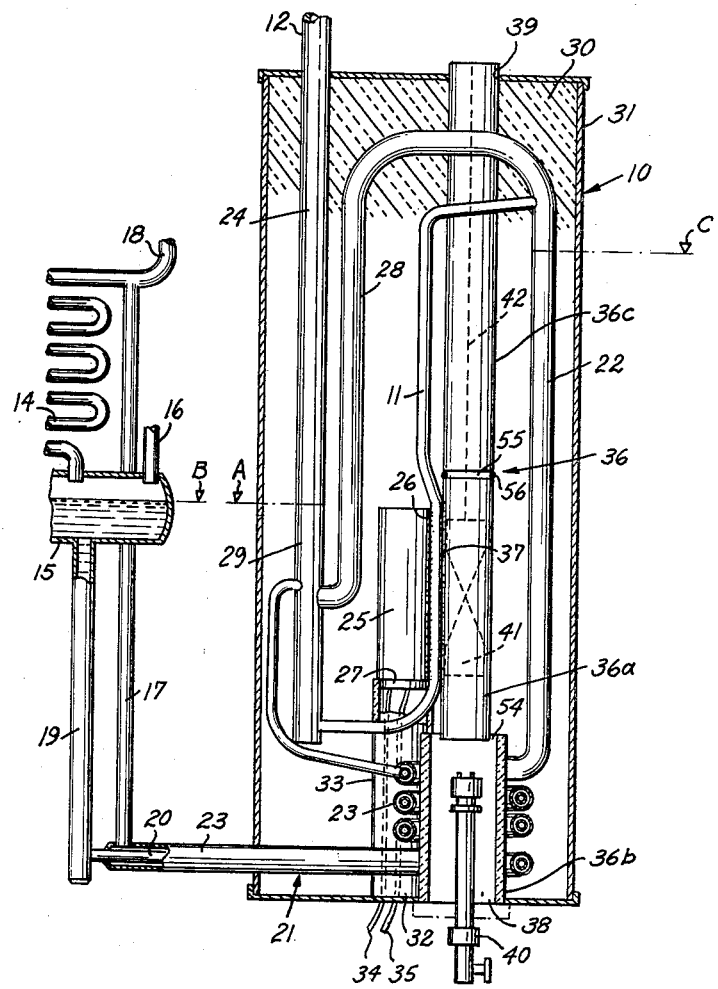
FIG. 1 illustrates more or less diagrammatically an absorption liquid circuit of absorption refrigeration apparatus including a generator or vapor-expulsion unit embodying the invention.

Referring to FIG. 1 of the drawing, the invention is embodied in absorption refrigeration apparatus of a uniform pressure type containing an inert pressure equalizing gas. Refrigerant vapor is expelled from absorption liquid in a vapor lift pipe 11 of vapor-expulsion unit 10, and, in a manner to be described presently, passes through a conduit 12 to a condenser. The refrigerant vapor, such as ammonia, is liquefied in the condenser and flows into an evaporator in which the refrigerant evaporates and diffuses into an inert gas, such as hydrogen, to produce a refrigerating effect. The resulting gas mixture of refrigerant and inert gas flows from the evaporator to an absorber which may be of an air-cooled type including a coil 14 and an absorber vessel 15 to which the lower end of the coil is connected, such gas mixture entering the absorber vessel 15 through a conduit 16.

In the absorber refrigerant is absorbed from the gas mixture into absorption liquid, such as water, which is delivered thereto through a conduit 17, and the absorption liquid enriched in refrigerant passes into the absorber vessel 15. The inert gas is returned from the absorber to the evaporator in the path of flow including a conduit 18, and the enriched absorption liquid is conducted through a conduit 19 and inner pipe 20 of a liquid heat exchanger 21 to the vapor-expulsion unit 10.

The absorption liquid from which refrigerant vapor has been expelled, which is referred to as weak absorption liquid, flows from the lower end of a standpipe 22 into the outer pipe 23 of liquid heat exchanger 21. From the outer passage of liquid heat exchanger 21 weak absorption liquid flows upwardly through conduit 17 into the upper part of the absorber to absorb refrigerant vapor. In order to simplify the drawing, the condenser, evaporator and connections therefor have not been shown, such parts being well known and their illustration not being necessary for an understanding of this invention.

Absorption solution enriched in refrigerant flows from the absorber vessel 15 through conduit 19 and inner pipe 20 of liquid heat exchanger 21 into a vertically extending standpipe 24. The extreme lower end of pipe 24 is in communication with the lower end of vapor lift pipe 11 which is in thermal exchange relation with a heating tube 25 at 26, as by welding, for example. The heating tube 25 is arranged to be heated by an electrical heating element 27 disposed within the tube.

The part of the pump or lift pipe 11 in thermal exchange relation with the heating tube 25 may be referred to as the vapor-forming part, in which vapor bubbles are formed due to heat derived from the heating tube. Due to the formation of these vapor bubbles which tend to collect and become larger and larger, liquid in the vapor lift pipe 11 becomes segregated, whereby slugs of liquid are caused to rise in the lift pipe by vapor lift action. Upward movement is imparted to liquid in the vapor lift pipe 11 under the influence of a "reaction head" formed by the liquid column maintained in standpipe 24.

Vapor generated in the vapor lift pipe 11 flows from the upper end thereof through the upper part of standpipe 22 and a conduit 28 to a region 29 in pipe 24 which serves as an analyzer and is disposed below the liquid surface level A of the liquid column contained therein, the liquid level A being essentially the same as the liquid level B in the absorber vessel 14. The absorption liquid introduced into the analyzer 29 is relatively rich in refrigerant and at a lower temperature than the generated vapor, and, in bubbling through the enriched solution, water vapor present in the vapor is cooled sufficiently and condenses and in this way is removed from ammonia vapor. From the analyzer 29 refrigerant vapor flows upwardly in pipe 24 into conduit 12 and passes to the condenser, as previously explained.

The absorption liquid from which refrigerant vapor has been expelled flows by gravity from standpipe 22 through the outer pipe 23 of liquid heat exchanger 21 and conduit 17 into the upper part of the absorber coil 14. The liquid surface level C maintained in standpipe 22 is at higher level than the region at which liquid is introduced into absorber 14 from the upper end of conduit 17.

The vapor-expulsion unit 10 in its entirety, together with a major portion of the liquid heat exchanger 21, are embedded in a body of insulation 30 retained in a metal shell or casing 31 having an opening 32 at the bottom thereof, the shell being rectangular or circular in horizontal cross-section. The heating tube 25 is embedded in a part of the insulation 30 which is intermediate the ends thereof and spaced from the top and bottom ends of the shell 30. The electrical heating element 27 is arranged to be positioned within the heating tube 25 through a hollow sleeve member 33 which is formed of suitable insulating material and extends from the bottom of the heating tube 25 to the bottom opening 32 in the shell 31.

The electrical conductors 34 and 35 for the electrical heating element 27 extend through the hollow sleeve member 33. The heating tube 25 snugly receives the heating element 27 which may comprise a cartridge housing an electrical wire or the like having a relatively high resistance that generates heat when connected to a source of electrical energy.

The vapor-expulsion unit or generator 10 of FIG. 1 is formed of piping to provide a compact bundle or cluster of parts which is elongated in the vertical direction and is relatively narrow in horizontal cross-section. Thus, the heating tube 25, vapor lift pipe 11, standpipes 22 and 24 and pipe 28 are formed of pipes or conduits disposed closely adjacent to one another, although they are diagrammatically illustrated in a single plane in FIG. 1 in order to simplify the drawing.

The vapor-expulsion unit 10 is arranged to be operated at will be two independent sources of heat, each of which alone is capable of supplying heat at an adequate rate and at a sufficiently elevated temperature to effect normal operation of the refrigeration appartaus under all conditions under which the apparatus is intended to be operated. This is accomplished by providing a second heating flue 36, the vapor forming part of the vapor lift pipe 11 being in thermal exchange relation with the heating flue 36 at 37, as by welding, for example. Hence, the same vertical zone of the vapor lift pipe 11 is in thermal exchange relation with both the heating tube 25 and the heating flue 36.

The lower end of heating flue 36 projects through a bottom opening 38 in the shell 31, and the upper end thereof projects through a top opening 39 in the shell. A suitable fluid fuel burner 40 is arranged to be supported in an upright position in any suitable manner at the lower end of the heating flue 36. An element 41, which is supported in any suitable manner by a chain or wire 42, is suspended in heating flue 36 to impart a swirling movement to upward flowing heating gases in flue 36 at the region it is thermally connected to vapor-lift pipe 11. The element 41 may be formed from a flat sheet metal plate which is twisted about an axis in a lengthwise direction.

It will now be understood that the heating tube 25, which forms a permanent part of the refrigeration apparatus, may be employed as a component of the heating structure suitable for electrical operation; and that the heating flue 36, which also forms a permanent part of the refrigeration apparatus, may be employed as a component of the heating structure suitable for operation by a burner to which a fluid fuel, such as gas or kerosene, for example, is adapted to be supplied.

When refrigeration apparatus like that illustrated in FIG. 1 is intended to be operated electrically, the electrical conductors 34 and 35 are connected to a suitable source of electrical supply. When the refrigeration apparatus of FIG. 1 is intended to be operated by a fluid fuel, the burner 40 is connected to a source of supply of the fuel and ignited.

It is desirable to protect the refrigeration apparatus so that, when the apparatus is being operated by one source of heat, the other source of heat cannot be rendered operable to supply heat to the vapor-explusion unit 10 and subject the latter to excessive heating which would tend to shorten the life of the refrigeration apparatus. Such a protective arrangement is diagrammatically shown in FIG. 5 in which the electrical heating element 27 is connected to a source of electrical energy by the conductors 34 and 35, a pair of spaced contacts 43 being provided in conductor 35; and the burner 40 is connected to a source of gaseous fuel, for example, by a pipe 44 in which is connected a solenoid operated valve 45 having a solenoid 46 connected by conductors 47 and 48 to the same source of electrical supply as the conductors 34 and 35. A pair of spaced contacts 49 are provided in conductor 47.

Figure 5:
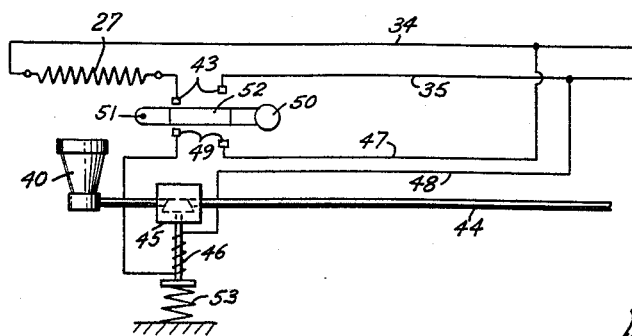
FIG. 5 is a diagrammatic representation of a circuit for controlling the heating of the vapor-expulsion units of FIGS. 1, 2 and 4.

A control member 50, which is pivoted at 51, is formed of insulating material and includes the electrically conductive section 52, bridges the contacts 43 and completes a circuit for heating element 27 when it is moved upward from its horizontal position shown in FIG. 5. With heating element 27 energized, solenoid 46 is de-energized and valve 45 is urged upward to its closed position by the action of a resilient element 53. When the member 50 is moved downward from its horizontal position, the electrically conductive section 52 bridges the contacts 49 and a circuit is completed for solenoid 46 which becomes effective to open valve 45 against the action of resilient element 53.

In accordance with this invention, loss of heat for vapor-lift pipe 11 to heating flue 36 is substantially reduced and arrested when electrical operation of the refrigeration apparatus is effected by heating element 27 and the vapor-lift pipe 11 receives heat only from heating tube 25. This is accomplished by dividing heating flue 36 into three sections 36a, 36b and 36c, the only part of heating flue 36 in good heat conductive relation with the vapor-lift pipe 11 being the intermediate flue section 36a. The bottom flue section 36b is of larger diameter than the intermediate flue section 36a and separated from the latter by an air gap 54. The bottom flue section 36b, the upper end of which desirably extends above the lower end of the flue section 36a, may be formed of metal or a material having poor heat conductivity, such as a ceramic material, for example.

The top flue section 36c is separated from the intermediate flue section 36a by an air space 55. When the top and intermediate flue sections are formed of metal, such as steel, for example, these flue sections may be held together by welds 56, or in any other suitable manner. If desired, the top flue section 36c also may be formed of a material having poor heat conductivity, such as a ceramic material, for example, in which case the provision of an air gap 55 between the top and intermediate flue sections 36c and 36a still is desirable.

The heating tube 25 and intermediate flue section 36a are, of course, formed of a material like steel, for example, having good heat conductivity, in order to transfer heat effectively to vapor-lift pipe 11. When the burner 40 is disconnected from the source of fluid fuel and electrical heating element 27 is energized, the heating tube 25 becomes heated and gives up its heat to vapor-lift pipe 11 in thermal contact therewith. While some of the heat transferred from heating tube 25 to vapor-lift pipe 11 flows from the pipe 11 to the intermediate flue section 36a, this intermediate flue section is relatively short compared to the entire length of the heating flue 36 which is necessary for the flow of heated combustion gases through the insulated upright shell 31. The air gaps 54 and 55 of the heating flue 36 throttle and obstruct the flow of heat from the intermediate flue section 36a to the top and bottom flue sections 36c and 36b, respectively, whereby the intermediate flue section 36a, having a relatively small mass, tends to reach the same elevated temperature to which the vapor-lift pipe 11 is heated. Since the intermediate flue section 36a is not only effectively shielded thermally from the top and bottom flue sections 36c and 36b but also effectively thermally shield from other parts of the generator or vapor expulsion unit 10, flow of heat therefrom is arrested and the vapor lift pipe 11 constitutes the single part of the vapor-expulsion unit 10 to which heat can be effectively transferred from the heating tube 25.

Figure 2:
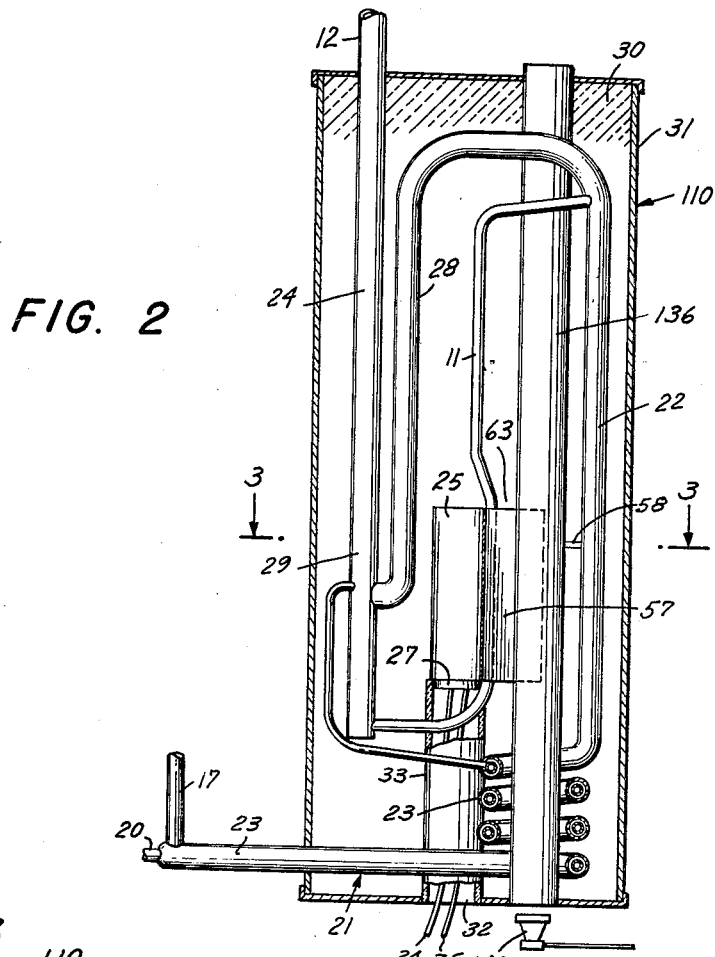
FIG. 2 is a fragmentary view of parts like those shown in FIG. 1 illustrating another embodiment of the invention.
Figure 3:
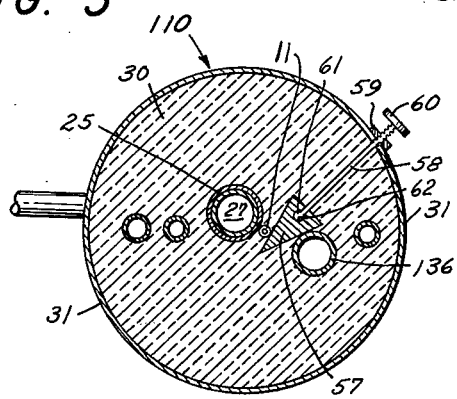
FIG. 3 is a sectional view taken at line 3—3 of FIG. 2.

In FIGS. 2 and 3 I have illustrated another embodiment in which flow of heat from vapor-lift pipe 11 to heating flue 136 is effectively arrested when the heating tube 25 is rendered operable to supply heat to the vapor-lift pipe. In FIG. 2, in which parts similar to those shown in FIG. 1 are designated by the some reference numerals, the heating flue 136 is formed from a single length of pipe having good heat conductivity. When the burner 140 is employed to supply heat to the vapor-expulsion unit 110, heat is effectively transferred from heating flue 136 to vapor-lift pipe 11 by a thermal bridging member 57 which is in good physical contact with both the heating flue 136 and the vapor-lift pipe 11, as shown in FIGS. 2 and 3. The member 57 is of triangular form in section and preferably extends vertically from a region at the same level as the upper end of heating tube 25 to a region at the same level as the lower end of the heating tube.

When the electrical heating element 27 is energized to render heating tube 25 operative to heat vapor-lift pipe 11 and burner 140 is disconnected from the source of supply of gaseous fuel, the member 57 is moved out of physical contact with the heating flue 136 and vapor-lift pipe 11. Any suitable mechanism may be employed to move member 57 into and out of physical contact with heating flue 136 and vapor-lift pipe 11. By way of example, a threaded rod 58 may be employed which extends through an apertured threaded fitting 59 at the side wall of shell 31, the outer end of which may be provided with a knob 60 and the inner end of which may be provided with a spherical-shaped part 61 held in a recess 62 in the member 57 and rotatable therein. When the member 57 is moved from the gap 63 between the vapor-lift pipe 11 and heating flue 136, flow of heat from the vapor-lift pipe to the heating flue is effectively throttled and arrested when the vapor-lift pipe is being heated by the heating tube 25.

Figure 4:
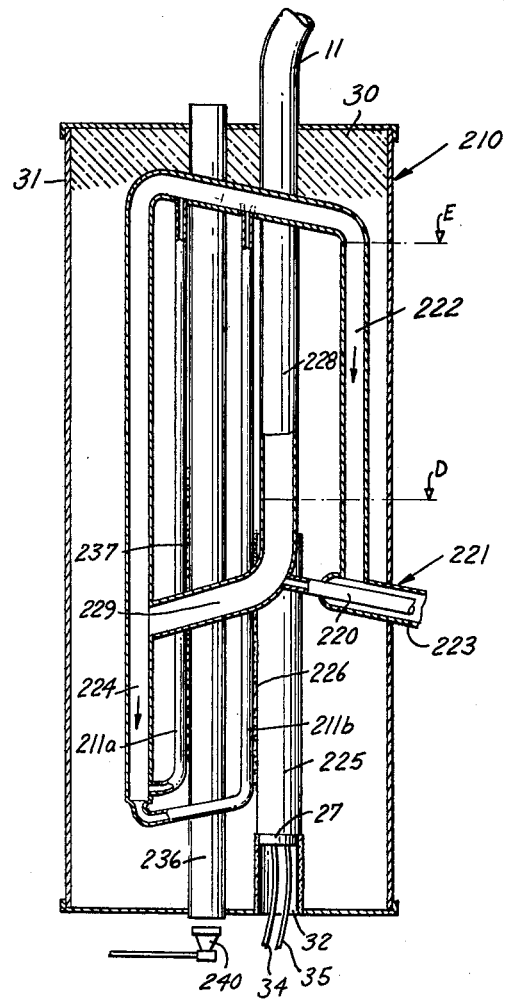
FIG. 4 is a fragmentary view of a generator or vapor-expulsion unit of the kind shown in FIG. 1 illustrating another embodiment of the invention.

Another embodiment of the invention is shown in FIG. 4 in which absorption liquid enriched in refrigerant flows from the inner passage 220 of a liquid heat exchanger 221 through the lower part 229 of a vertically extending pipe 228 into a standpipe 224. The extreme lower end of pipe 224 is in communication with vapor-lift pipes 211a and 211b. Vapor generated in vapor-lift pipes 211a and 211b flows from the upper ends thereof through the standpipe 224 and the region 229 of standpipe 228 which serves as an analyzer and is disposed below the liquid level D of the liquid column contained therein, the liquid level D corresponding to the liquid level A in FIG. 1. From the analyzer 229 refrigerant vapor flows upwardly in pipe 228 into conduit 11 and passes to the condenser.

The absorption liquid from which refrigerant vapor has been expelled flows by gravity from pipe 222 through the outer pipe 223 of liquid heat exchanger 221 and conduit 17 into the upper part of absorber coil 14, in the manner illustrated in FIG. 1. The liquid surface level E in pipe 222 corresponds to the liquid level C in FIG. 1. In FIG. 4 the vapor-lift pipe 211a is heat conductively connected at 237 to heating flue 236, and the vapor-lift pipe 211b is heat conductively connected at 226 to heating tube 225 which is heated by electrical heating element 27. It will be seen in FIG. 4 that the heating flue 236 and heating tube 225 are heat conductively connected to vapor-lift pipes 211a and 211b essentially along the same vertically extending zone of the vapor-expulsion unit 210.

When burner 240 is operative and heating of vapor-lift pipe 221a is effected by heating flue 236, the heating element 27 being de-energized, there will be no heat loss from vapor-lift pipe 211a to heating tube 225 because these parts are separated from one another. Conversely, when heating element 27 is energized and vapor-lift pipe 211b is heated by heating tube 225, the burner 240 being disconnected from the source of supply of gaseous fuel, there will be no heat loss from vapor-lift pipe 211b to heating flue 236 because these parts are separated from one another.

While the vapor-lift pipes 211a and 211b are connected in parallel in the embodiment of FIG. 4, it is to be understood that these vapor-lift pipes are not intended to be operated simultaneously because either the burner 240 or electrical heating element 25 alone is capable of supplying heat at an adequate rate and at a sufficiently elevated temperature to effect normal operation of the refrigeration apparatus under all conditions under which the apparatus is intended to be operated.

Although several embodiments of the invention have been shown and described, it will be apparent to those skilled in the art that various modifications and changes may be made without departing from the spirit and scope of the invention. For example, in FIG. 1 the heating flue 36 may also be heat conductively connected to standpipe 22, and in FIG. 4 the heating flue 236 may be heat conductively connected to standpipe 222, such additional heat conductive connections preferably being along the same vertical zones the vapor-lift pipes 11 are connected to the heating flues 36 and 236, respectively. It is therefore contemplated to cover all modifications and changes which come within the true spirit of the invention, as pointed out in the following claims.

What is claimed:

1. In absorption refrigeration apparatus, heat receiving structure, a plurality of members, separate means for heat conductively connecting each of said members to said structure, a plurality of different heating means, each of said heating means being arranged to heat a different one of said members, said members being so constructed and formed that each of said members above is capable of supplying heat at an adequate rate and at a sufficiently elevated temperature to effect normal operation of the refrigeration apparatus under all conditions under which the apparatus is intended to be operated when heated by the heating means associated therewith, and means for throttling flow of heat from said receiving structure to one of said members when the refrigeration apparatus is being operated by another of said heating members.

2. In absorption refrigeration apparatus, a vapor-expulsion unit having a heat receiving structure for expelling refrigerant from absorption solution therein, first and second heating systems for the apparatus, the first heating system comprising a first member, first means for heat conductively connecting said first member to said structure, a first heater for heating said first member, first means for connecting said first heater to a first source of heat, the second heating system comprising a second member, second means for heat conductively connecting said second member to said structure, a second heater for heating said second member, and second means for connecting said second heater to a second source of heat, the heat receiving structure and the first and second heating systems being so constructed and arranged that when the heat receiving structure receives heat from one of the heating systems and the other heating system is inoperative, flow of heat from the heat receiving structure to the other heating system is throttled, and each of the members alone being capable of supplying heat at an adequate rate and at a sufficiently elevated temperature to effect normal operation of the refrigeration apparatus under all conditions under which the apparatus is intended to be operated when heated by the heating means associated therewith.

3. Apparatus as set forth in claim 2 in which the heat receiving structure comprises first and second vapor-liquid lift pumps each having a vapor-forming part, the first heat conductive connecting means connecting the vapor-forming part of the first pump and the first member, the second heat conductive connecting means connecting the vapor-forming part of the second pump and the second member, the pumps being separated from one another through a vertically extending zone including the vapor-forming parts.

4. In absorption refrigeration apparatus, a vapor-expulsion unit having a heat receiving structure including vapor-liquid lift pumping means for expelling refrigerant from absorption solution therein, first and second heating systems for the apparatus, the first heating system comprising a first member, first means for heat conductively connecting said first member to said pumping means, a first heater for heating said first member, first means for connecting said first heater to a first source of heat, the second heating system comprising a second member, second means for heat conductively connecting said second member to said pumping means, a second heater for heating said second member, and second means for connecting said second heater to a second source of heat, the first and second heating systems being so constructed and arranged that when the pumping means receives heat from one of the heating systems and the other heating system is inoperative, flow of heat from the pumping means to the other heating system is throttled, and each of the members alone being capable of supplying heat at an adequate rate and at a sufficiently elevated temperature to effect normal operation of the refrigeration apparatus under all operating conditions under which the apparatus is intended to be operated when heated by the heating means associated therewith.

5. Apparatus as set forth in claim 4 in which the vapor-liquid lift pumping means comprises piping, and the first and second heat conductive connecting means respectively connects the first and second members to the piping.

6. Apparatus as set forth in claim 4 in which the first heat conductive connecting means includes provisions for adjusting the heat conductive connection between the piping and the first member.

7. Apparatus as set forth in claim 4 in which the vapor-liquid lift pumping means comprises first and second vapor-liquid lift pumps, the first and second heat conductive connecting means respectively connecting the first and second members to the first and second pumps.

8. Apparatus as set forth in claim 4 in which the first heating system comprises a fluid fuel heating system having a flue including the first member, the first member being thermally shielded from the flue.

9. In absorption refrigeration apparatus having an absorption liquid circuit including an absorber and a vapor-expulsion unit, said vapor-expulsion unit comprising vapor-liquid lift pumping means for circulating absorption solution in said circuit, first heating structure comprising a first hollow member and means for heat conductively connecting the exterior surface of said first hollow member to an exterior surface of said pumping means at a vertically extending zone of said unit, a second heating structure comprising a second hollow member and means for heat conductively connecting the exterior surface of said second hollow member to an exterior surface of said pumping means essentially at the aforementioned vertically extending zone of said unit, a first heater for heating said first hollow member, first means for connecting said first heater to a first source of heat, a second heater for heating said second hollow member, and second means for connecting said second heater to a second source of heat, the first and second heating structures being so constructed and arranged that when the pumping means receives heat from the first heating structure and the second heating structure is inoperative, flow of heat from the pumping means to the second heating structure is throttled, and each of the heating structures alone being capable of supplying heat at an adequate rate and at a sufficiently elevated temperature to effect normal operation of the refrigeration apparatus under all conditions under which the apparatus is intended to be operated when heated by the heater associated therewith.

10. Apparatus as set forth in claim 9 in which the pumping means comprises a single vertical pipe and the first and second heat conductive connecting means respectively connect the first and second members to the pipe.

11. Apparatus as set forth in claim 10 in which the second heating structure includes a heating flue for combustion gases and the second heater comprises a fluid fuel burner operatively associated with the flue, the heating flue including the second member, the second member forming an intermediate part of the flue and being thermally shielded from the top part of the flue.

12. Apparatus as set forth in claim 11 in which the second member is thermally shielded from the bottom part of the flue.

13. Apparatus as set forth in claim 9 in which the second heat conductive connecting means includes structure for making and breaking the heat conductive connection between the pumping means and the second member.

14. Apparatus as set forth in claim 10 in which the second heat conductive connecting means includes structure for making and breaking the heat conductive connection between the pipe and the second member.

15. Apparatus as set forth in claim 9 in which the vapor-liquid lift pumping means comprises first and second pipes in which slugs of liquid are segregated by vapor adapted to be formed therein, the first heat conductive connecting means connecting the first pipe and the first member and the second heat conductive connecting means connecting the second pipe and the second member, and the pipes being spaced from one another.

16. Apparatus as set forth in claim 15 in which the first heater comprises an electrical heating element and the first hollow member is arranged to be heated by the element, and the second heater comprises a fluid fuel burner and the second hollow member comprises a heating flue arranged to be heated by the burner.

References Cited in the file of this patent
UNITED STATES PATENTS

| | | |
|---|---|---|
| 1,729,355 | Munters | Sept. 24, 1929 |
| 2,363,771 | Bergholm | Nov. 28, 1944 |

UNITED STATES PATENT OFFICE
CERTIFICATE OF CORRECTION

Patent No. 3,080,729                          March 12, 1963

Gunnar Axel Grubb

It is hereby certified that error appears in the above numbered patent requiring correction and that the said Letters Patent should read as corrected below.

Column 1, line 15, for "member" read -- members --; column 3, line 20, for "be" read -- by --; line 23, for "appartaus" read -- apparatus --; column 5, line 62, for "221a" read -- 211a --; column 6, line 27, for "above" read -- alone --.

Signed and sealed this 1st day of October 1963.

(SEAL)
Attest:

ERNEST W. SWIDER                          DAVID L. LADD
Attesting Officer                          Commissioner of Patents